(12) United States Patent
Plattner (10) Patent No.: US 12,041,871 B2
(45) Date of Patent: Jul. 23, 2024

(54) APPARATUS, SYSTEM AND METHOD FOR MONITORING AND MAPPING AIR SEEDER PERFORMANCE

(71) Applicant: Precision Planting LLC, Tremont, IL (US)

(72) Inventor: Chad Plattner, Tremont, IL (US)

(73) Assignee: Precision Planting LLC, Tremont, IL (US)

( * ) Notice: Subject to any disclaimer, the term of this patent is extended or adjusted under 35 U.S.C. 154(b) by 570 days.

(21) Appl. No.: 17/274,411

(22) PCT Filed: Aug. 16, 2019

(86) PCT No.: PCT/IB2019/056947
§ 371 (c)(1),
(2) Date: Mar. 8, 2021

(87) PCT Pub. No.: WO2020/049387
PCT Pub. Date: Mar. 12, 2020

(65) Prior Publication Data
US 2021/0267118 A1    Sep. 2, 2021

Related U.S. Application Data

(60) Provisional application No. 62/728,589, filed on Sep. 7, 2018.

(51) Int. Cl.
*A01C 7/10* (2006.01)
*G01C 21/00* (2006.01)
(Continued)

(52) U.S. Cl.
CPC .......... *A01C 7/105* (2013.01); *G01C 21/3807* (2020.08); *G01S 19/14* (2013.01); *G07C 5/06* (2013.01)

(58) Field of Classification Search
CPC ..... A01C 7/105; G01C 21/3807; G01S 19/14; G07C 5/06
See application file for complete search history.

(56) References Cited

U.S. PATENT DOCUMENTS 8,386,137 B2   2/2013  Sander et al.
8,695,396 B2   4/2014  Landphair et al.
(Continued)

FOREIGN PATENT DOCUMENTS

WO   WO-2014026183 A2 *  2/2014  ........... A01B 79/005
WO   2014/186041 A1   11/2014
WO   WO-2014186041 A1 *  11/2014  ........... A01B 79/005

OTHER PUBLICATIONS

AGCO Corporation, Sunflower Air Seeder Brochure as published @ https://www.sunflowermfg.com/content/dam/Brands/Sunflower/US/literature/sunflower-seeding-tools-brochure.pdf/_jcr_content/renditions/original, 2017.

(Continued)

*Primary Examiner* — Jelani A Smith
*Assistant Examiner* — Nada Mahyoob Alqaderi (57) ABSTRACT

A system and method (1200) for monitoring operating performance of a seeder. A sensor is disposed in each distribution line (58) of the seeder to detect gaps in the product stream. If the duration of the gap exceeds a gap threshold, the gap is recorded. In one embodiment, GPS coordinates are associated with each recorded gap which is then displayed on a field map such that the operator has a real-time a visual representation of each recorded gap within the field as the seeder advances through the field. In another embodiment, a gap rate (1311) is calculated and displayed by determining the number of occurrences of the recorded gaps over a distance or area. In another embodiment, an (Continued)

economic loss value is calculated and displayed based on different ranges of the calculated gap rate (1311).

32 Claims, 6 Drawing Sheets

(51) Int. Cl.
*G01S 19/14* (2010.01)
*G07C 5/06* (2006.01)

(56) References Cited

U.S. PATENT DOCUMENTS

| | | | |
|---|---|---|---|
| 9,699,958 | B2 | 7/2017 | Koch et al. |
| 2010/0010667 | A1* | 1/2010 | Sauder ............... B60Q 1/26 345/440.2 |
| 2010/0264163 | A1 | 10/2010 | Tevs et al. |
| 2011/0098851 | A1* | 4/2011 | Glendenning ......... A01C 7/105 700/240 |
| 2014/0186041 | A1 | 7/2014 | Shellhammer et al. |
| 2014/0331631 | A1* | 11/2014 | Sauder ............... G01B 5/10 56/10.2 R |
| 2015/0237795 | A1* | 8/2015 | Koch ............... G07C 5/085 701/50 |
| 2018/0121726 | A1* | 5/2018 | Redden ............... A01G 22/00 |

OTHER PUBLICATIONS

European Patent Office, International Search Report for International Application No. PCT/IB2019/056947, mail date Nov. 6, 2019.

* cited by examiner

APPARATUS, SYSTEM AND METHOD FOR MONITORING AND MAPPING AIR SEEDER PERFORMANCE

BACKGROUND

Air seeders are equipped with feed rate controllers connected to variable speed drives in order to adjust the amount of product being metered from the product tanks into the main airstream conduit in order to achieve a preselected product application rate. The main airstream conduit carrying the metered product is then divided into various distribution lines which ideally deliver equal amounts of product to each of the various row units across the width of the air seeder. A meter speed sensor may be located on the product meters to measure the meter speed. Additionally, or alternatively a feed rate sensor may be located downstream of the product meters to measure the feed rate of the meters before the product enters the main airstream. The feed rate sensors or meter speed sensors provide feedback to the feed rate controllers to adjust the meter speed as needed to achieve the preselected product application rate.

While the foregoing meter speed sensors or feed rate sensors may accurately detect the amount of product discharged by the meters into the main airstream, the meter speed sensors or feed rate sensors are unable to detect whether product is being delivered to each row unit through the downstream distribution lines. Thus, it is also known to provide blockage sensors in each of the downstream distribution lines feeding each row unit in order to sense a "no-flow" or "low flow" condition to alert the operator that a particular row unit is not seeding properly. The operator can then stop seeding operations and trace the downstream distribution line from the affected row unit to determine if there is a blockage in the distribution line somewhere between the affected row unit and the main airstream conduit or if there some other problem affecting the performance of the row unit.

It should be appreciated that when operating air seeders, particularly when applying product at high application rates such as small seeds (e.g., canola, flax, millet, oats, wheat, barley, etc.) and granular fertilizers wherein the application rate is typically measured by product weight per acre, the product generally flows through the distribution lines to each row unit in a substantially continuous product stream. However, during seeding operations, the substantially continuous product stream can be momentarily interrupted due to any number of factors resulting in momentary "gaps" in the product stream. Examples of momentary gaps in the substantially continuous product stream may be due to momentary or partial meter blockage, momentary or partial obstructions within the distribution lines that quickly clear themselves, some seeds ricocheting within the distribution lines due to a bend in the lines or a slightly worn area of the distribution line causing some seeds in the airstream to slow down relative to other seeds in the air stream, etc.

Even assuming the blockage sensors provided in the downstream distribution lines of commercially available air seeders could be configured to detect these momentary gaps, the available monitoring systems utilized by operators will only provide an alert to the operator if the duration of the momentary gap is of sufficient duration to warrant an alert to the operator of a "no-flow" or "low flow" condition.

U.S. Pat. No. 9,699,958 ("the '958 patent") and U.S. Pat. No. 8,386,137 ("the '137 patent"), both originally filed by Precision Planting LLC and both of which are now owned by The Climate Corporation, each disclose a monitoring system that provides real-time, visual indication of seed skips, seed multiples and other operating and agronomic data with respect to the planter's performance. A commercial embodiment of the '958 patent was sold by Precision Planting LLC under the name FieldView®, and is now sold by The Climate Corporation under that same product name. A commercial embodiment of the '137 patent is sold by Precision Planting LLC under the name 20/20 SeedSense. The systems disclosed in the '958 patent and the '137 patent and commercially embodied in the FieldView® and 20/20 SeedSense systems, respectively, are configured for "singulating planters", i.e., row crop planters having seed singulating meters that discharge individual seeds at regularly spaced intervals for depositing into the seed trench.

As disclosed in the '958 patent and '137 patent, seed sensors are provided on the seed tubes to count the individual singulated seeds discharged by the seed singulating meters. The accurate detection of each individual seed and the timing between each of those individual seeds is critical to the function of the monitoring system. As disclosed in the '958 and '137 patents, each seed passing the seed sensor generates a seed pulse which is counted, time stamped and associated with a GPS coordinate. If the time elapsed between two successive seed pulses is within a predetermined time period of when the subsequent seed pulse was expected based on the preselected seed population rate and planter ground speed, a "good spacing" signal is generated. However, if the time elapsed between two successive seed pulses exceeds a defined time period, a "seed skip" signal is generated. Likewise if the time lapse between two successive seed pulses is less than a defined time period, a "seed multiple" signal is generated. Additionally, if the time elapsed between two successive seed pulses is greater than the time period associated with a "good spacing", but is less than the time period associated with a "seed skip", a signal is generated reflecting a "misplaced seed". Likewise, if the time elapsed between two successive seed pulses is less than the time period associated with a "good spacing", but is greater than the time period associated with a "seed multiple" another "misplaced seed" signal is generated. Each generated "good spacing" signal", "misplaced seed" signal, "seed skip" signal and "seed multiple" signal is graphically displayed on the display screen in the '137 patent. In the '958 patent, each generated "good spacing" signal", "misplaced seed" signal, "seed skip" signal and "seed multiple" signal is mapped on an aerial view of the field on the display screen in real time in a different color or other coding scheme to visually indicate how well the seeds are spaced as the planter traverses the field. For example, "good spacing" signals may be displayed in green, "seed skips" may be displayed in red, "seed multiple" signals may be displayed in orange, and any "improper spacing" signals may be displayed in yellow. Each spacing signal may be associated with an agronomic value which is also displayed to the operator providing an indication of the economic loss due to poor seed spacing.

While the '958 patent and the '137 patents and their commercial embodiments serve their intended purposes very well, such systems are not able to be used for air seeders which typically apply product at much higher application rates than singulating planters, because at the high application rates at which air seeders typically operate, it is not currently feasible to separately count each individual particle within the product stream as it passes through the distribution tubes, time stamp each individual particle and associate each particle with a GPS coordinate as described in the '958 and '137 patent.

Accordingly, a need remains for a monitoring system for air seeders or grain drills to provide a real-time visual indication of the air seeder's or grain drill's performance by detecting and displaying gaps in the product stream on a field map.

DESCRIPTION

Figure 1:
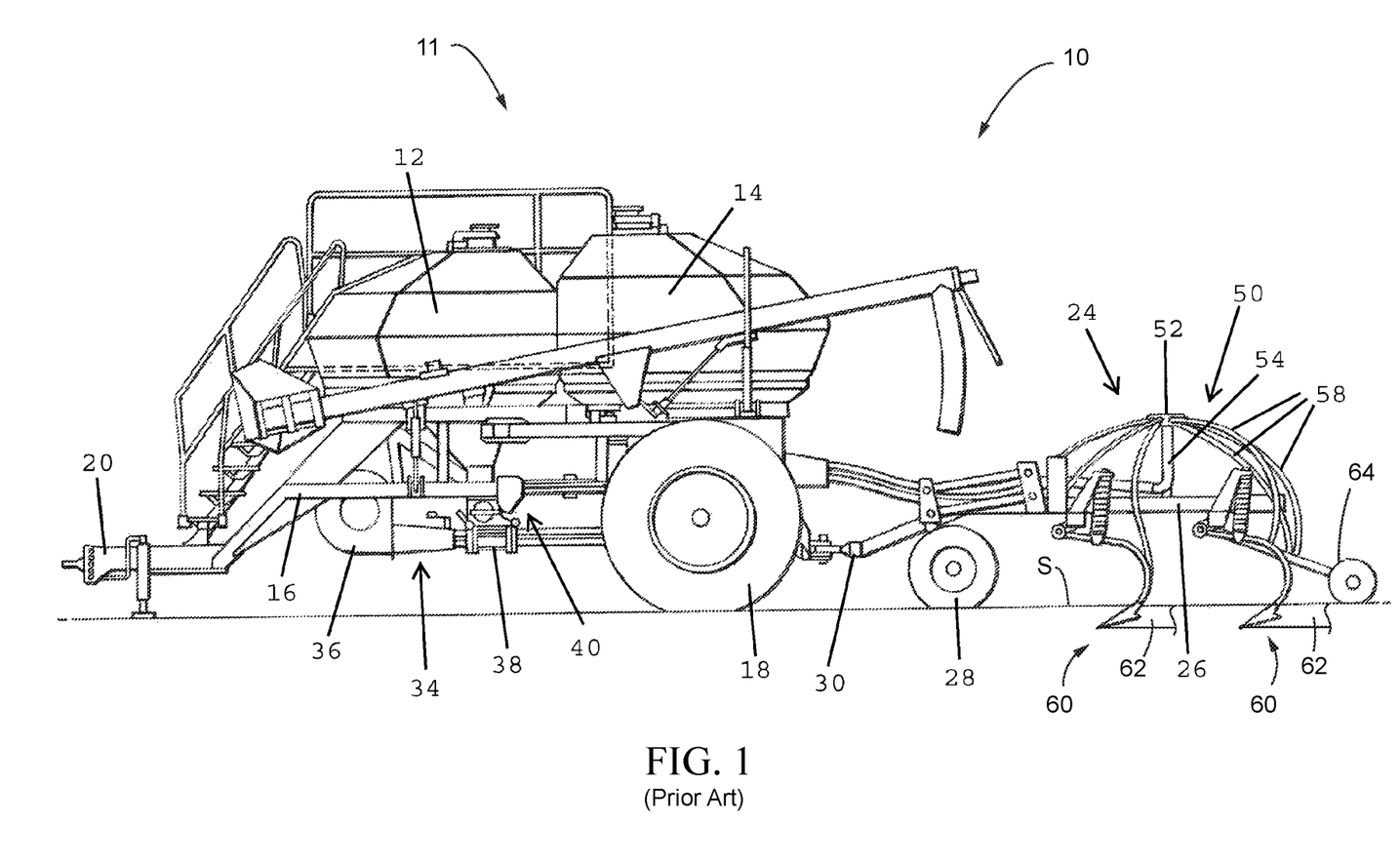
FIG. 1 is a side elevation view of an embodiment of a conventional air seeder.

Referring now to the drawings, wherein like reference numerals designate the same or corresponding parts throughout the several views, FIG. 1 illustrates an embodiment of an air seeding system 10 for delivering seed and fertilizer to a soil surface such as disclosed in U.S. Patent Publication No. US2010/0264163 and U.S. Pat. No. 8,695, 396, both of which are incorporated herein in their entireties by reference.

Air Seeder Overview

As used herein, seeder refers to an air seeder, which is described below, or to a grain drill. For exemplification, the systems and methods will be illustrated with an air seeder. In the embodiment of the air seeding system 10 of FIG. 1, the air seeding system 10 is shown as comprising an air cart 11 and a ground engaging implement 24. The air cart 11, includes holding tanks 12, 14 for holding seed, fertilizer or other product for delivery to the soil. The holding tanks 12, 14 are mounted on a frame 16 supported by ground wheels 18 for forward movement over the ground by a towing vehicle (not shown) connected to a forward hitch 20. The ground engaging implement 24 includes a frame 26 supported by ground wheels 28 and connected to the rear of the air cart frame 16 by a hitch 30. The frame 26 supports a plurality of row units 60. In alternative arrangements, the ground engaging implement 24 may be in front of the air cart 11 or the ground engaging implement 24 and air cart 11 may be combined onto a common frame. Thus, all references to an air seeding system 10 or an "air seeder" 10, for short, are intended to encompass each of the foregoing arrangements. A more detailed description of the air seeder 10 and its operation are provided later. Examples of grain drills are Sunflower Grain Drills available from AGCO Corporation, such as Models 9413, 9421, 9435, 9510, 9531, or 9610, which are described at (https://www.sunflowermfg.com/content/dam/Brands/Sunflower/US/literature/sunflower-seeding-tools-brochure.pdf/_jcr_content/renditions/original), the contents of which are incorporated herein by reference in its entirety. Instead of an air stream, the seeds are gravity fed through a steam to the seed trench.

Monitor System Overview

Figure 4:
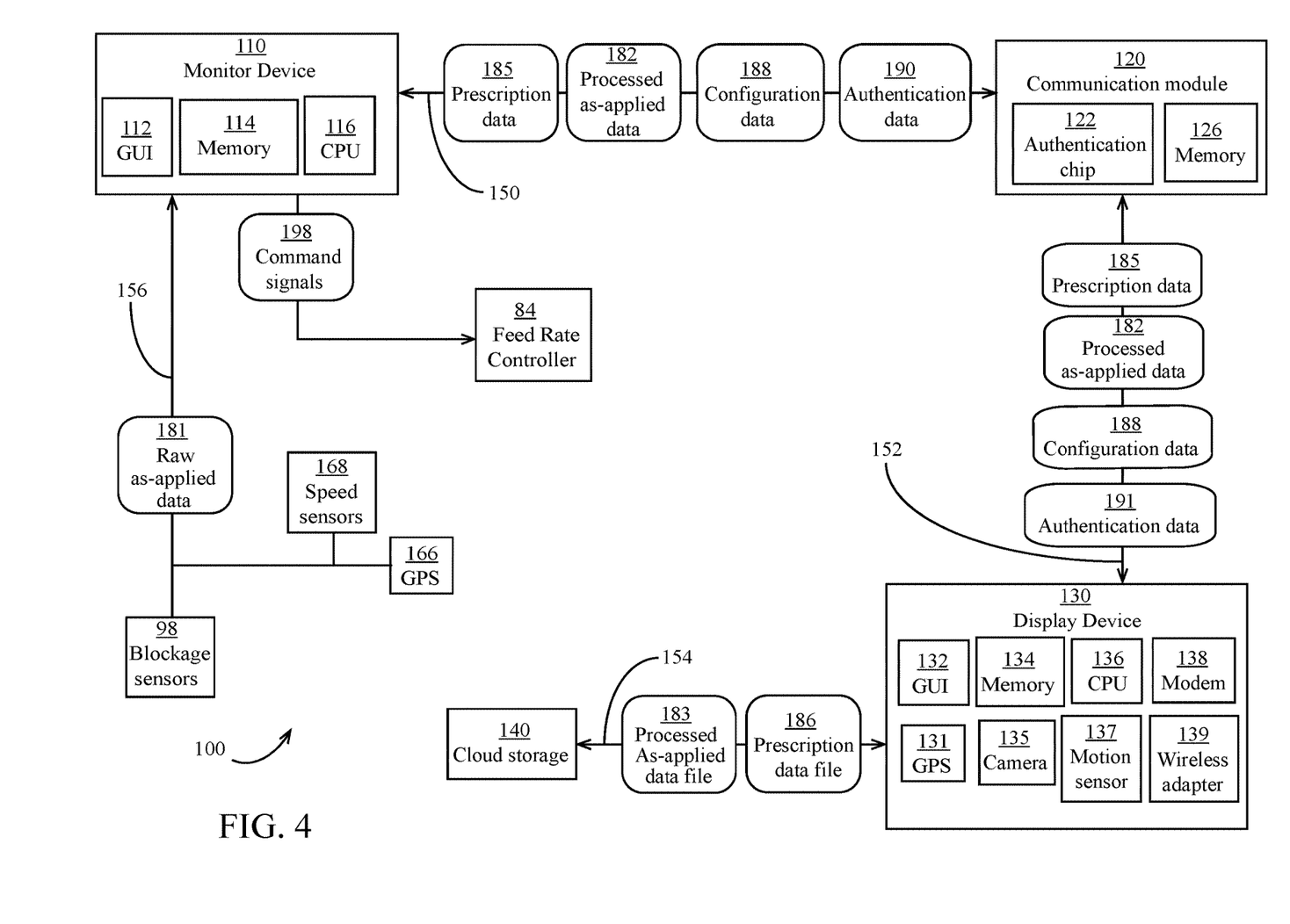
FIG. 4 schematically illustrates an embodiment of a monitor system and data transmission between components of the monitor system.

FIG. 4 is a schematic illustration of a monitor system 100 for use with the air seeder 10. The embodiment of the monitor system 100 includes a monitor device 110, a communication module 120, and a display device 130. The display device 130, communication module 120, and monitor device 110 may be mounted in the cab of the tractor. The monitor device 110 may include a graphical user interface (GUI) 112, memory 114, and a central processing unit (CPU) 116. The monitor device 110 is in electrical communication with the communication module 120 via a harness 150. The communication module 120 may include an authentication chip 122 and memory 126. The communication module 120 is in electrical communication with the display device 130 via a harness 152. The display device 130 may include a GUI 132, memory 134, a CPU 136 and a wireless Internet connection 154 for connecting to a "cloud" based storage server 140. One such wireless Internet connection 154 may comprise a cellular modem 138. Alternatively, the wireless Internet connection 154 may comprise a wireless adapter 139 for establishing an Internet connection via a wireless router.

The display device 130 may be a consumer computing device or other multi-function computing device. The display device 130 may include general purpose software including an Internet browser. The display device 130 also may include a motion sensor 137, such as a gyroscope or accelerometer, and may use a signal generated by the motion sensor 137 to determine a desired modification of the GUI 132. The display device 130 may also include a digital camera 135 whereby pictures taken with the camera 135 may be associated with a global positioning system (GPS) position, stored in the memory 134 and transferred to the cloud storage server 140. The display device 130 may also include a GPS receiver 131.

Monitor System Operation

Figure 5:
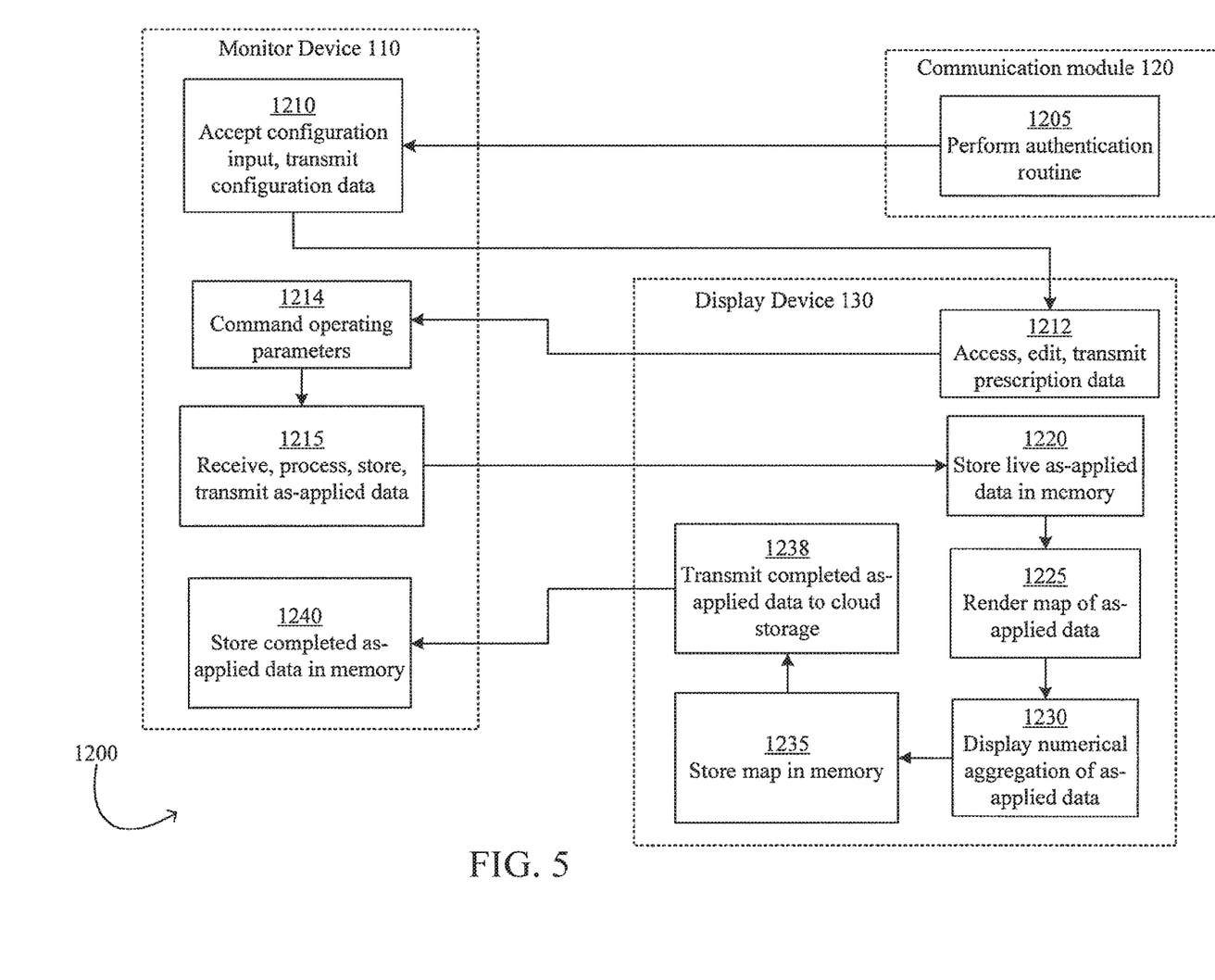
FIG. 5 illustrates an embodiment of a process for setting up a monitor system, controlling the air seeder, and storing and mapping operational data.

In operation, referring to FIG. 5 in combination with FIG. 4, the monitor system 100 may carry out a process designated generally by reference numeral 1200. At step 1205, the communication module 120 performs an optional authentication routine in which the communication module 120 receives a first set of authentication data 190 from the monitor device 110 and the authentication chip 122 compares the authentication data 190 to a key, token or code stored in the memory 126 of the communication module 120 or which is transmitted from the display device 130. If the authentication data 190 is correct, the communication module 120 transmits a second set of authentication data 191 to the display device 130 such that the display device 130 permits transfer of other data between the monitor device 110 and the display device 130 via the communication module 120.

At step 1210, the monitor device 110 accepts configuration input entered by the user via the GUI 112. In some embodiments, the GUI 112 may be omitted and configuration input may be entered by the user via the GUI 132 of the display device 130. The configuration input may comprise parameters including dimensional offsets between the row units 60 and a GPS receiver 166 mounted on the tractor or the GPS receiver 131 of the display device 130 positioned in the cab of the tractor. The monitor device 110 then transmits the resulting configuration data 188 to the display device 130 via the communication module 120.

At step 1212, the display device 130 may access prescription data files 186 from the cloud storage server 140. The prescription data files 186 may include a file (e.g., a shape file) containing geographic boundaries (e.g., a field boundary) and relating geographic locations (e.g., GPS coordinates) to operating parameters (e.g., product application rates). The display device 130 may allow the user to edit the prescription data file 186 using the GUI 132. The display device 130 may reconfigure the prescription data file 186 for use by the monitor device 110 and transmits resulting prescription data 185 to the monitor device 110 via the communication module 120.

At step 1214, as the air seeder 10 traverses the field, the monitor device 110 sends command signals 198 to the feed rate controller 84 to adjust the feed rate of the product meters 76, 78 (discussed later) based on changes in ground speed or changes in application rates based on the prescription map. At step 1215, as the air seeder 10 traverses the field, the monitor device 110 receives raw as-applied data 181 including signals from blockage sensors 98 (discussed later) and the GPS receiver 166, 131. The monitor device 110 processes the raw as-applied data 181, and stores the as-applied data to the memory 114. The monitor device 110 transmits processed as-applied data 182 to the display device 130 via the communication module 120. The processed as-applied data 182 may be streaming, piecewise, or partial data.

It should be appreciated that according to the method 1200, implement control and data storage are performed by the monitor device 110 such that if the display device 130 stops functioning, is removed from the monitor system 100, or is used for other functions, the implement operations and essential data storage are not interrupted.

At step 1220, the display device 130 receives and stores the live processed as-applied data 182 in the memory 134. At step 1225, the display device 130 renders a map of the processed as-applied data 182 as described later. The map may include a set of map images superimposed on an aerial image. At step 1230, the display device 130 displays a numerical aggregation of as-applied data (e.g., Gap Rate as discussed later). At step 1235, the display device 130 may store the location, size and other display characteristics of the map images rendered at step 1225 in the memory 134. At step 1238, after completing field operations, the display device 130 transmits the processed as-applied data file 183 to the cloud storage server 140. The processed as-applied data file 183 may be a complete file (e.g., a data file). At step 1240 the monitor device 110 stores completed as-applied data (e.g., in a data file) in the memory 114.

It should be appreciated that the as-applied data referenced above may include product application rates, Gaps/Acre (described later) and Gap Rates (described later), as well as other operational or performance characteristics of the air seeder 10, including, for example, measured downforces, and ride quality maps such as disclosed in the '958 patent. However, it should be appreciated that the air seeder 10, or individual row units 60, or gangs of row units 60, would require additional instrumentation with appropriate sensors (e.g., downforce sensors, accelerometers, etc.) as disclosed in the '958 patent to measure and display such operational or performance characteristics.

Air Seeder Operation

Figure 2:
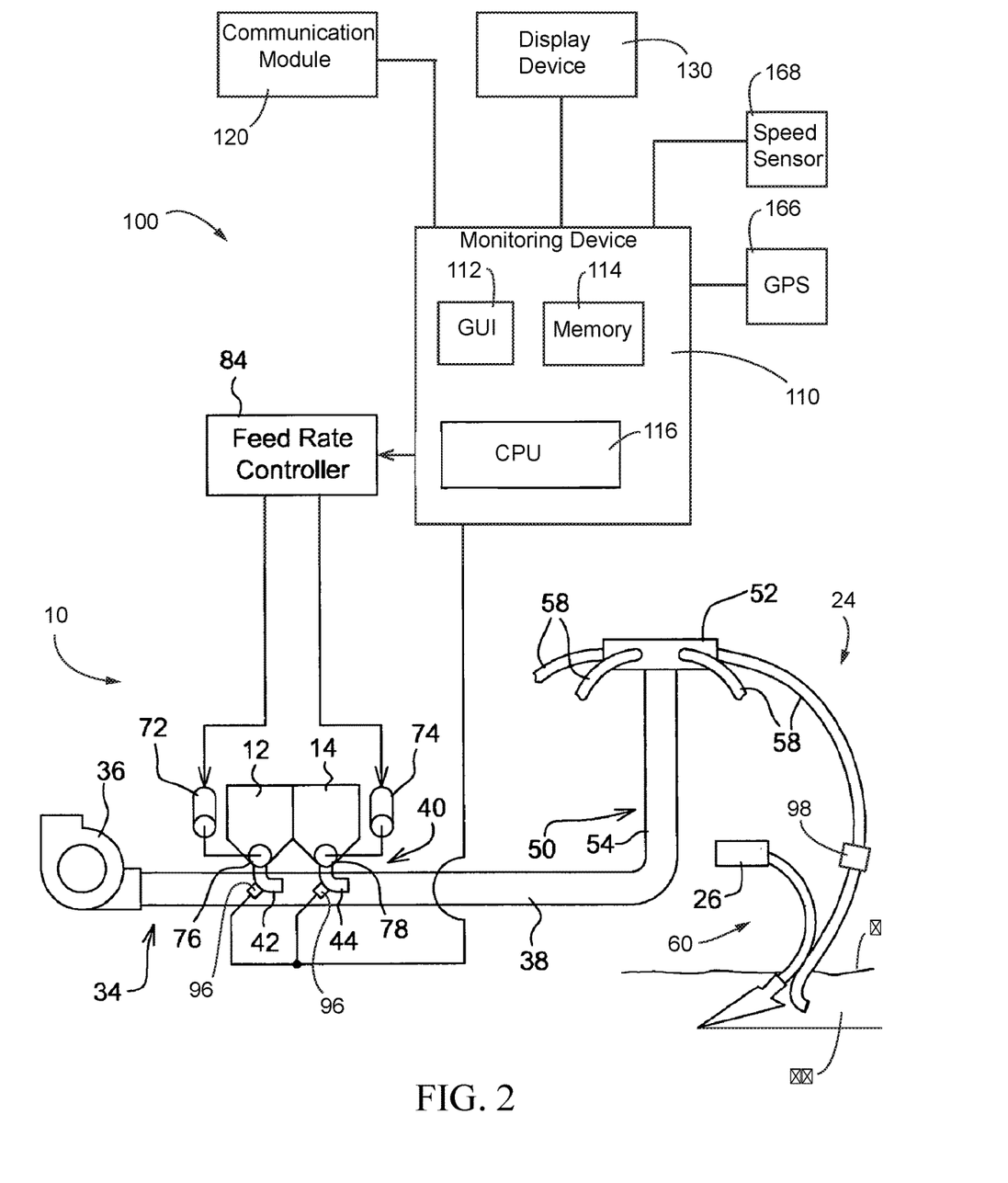
FIG. 2 is a schematic diagram of an air seeder.

Referring to FIG. 2, the air seeder 10 includes an air distribution system 34 such as disclosed in U.S. Pat. No. 6,213,690, which is incorporated herein in its entirety by reference. The air distribution system 34 includes a fan 36 for directing air through a main conduit 38. A metering mechanism 40 is located at the bottom of each tank 12, 14 for delivering metered amounts of seed and fertilizer products through product passages 42, 44 from the respective tanks 12, 14 into main conduits 38 (only one main conduit 38 is shown in FIGS. 1 and 2). Product metered by the metering mechanism 40 into the main conduits 38 is carried by the air stream to a downstream distribution tower 50. Typically, there will be one tower 50 for each main conduit 38. Additionally, separate main conduits 38 may be provided for each of the respective tanks, such that different products within those respective tanks 12, 14 may be distributed separately to a respective tower 50 for delivery via separate distribution lines 58 to individual row units 60 as described below. Alternatively, the product from the respective tanks 12, 14 may be combined in a common main conduit 38 as shown in FIG. 2 for distribution together. While two tanks 12, 14 are shown with the associated metering mechanisms 40 and main conduits 38, it should be appreciated that any number of tanks, metering mechanisms 40 and main conduits 38, may be provided on the air seeder 10 as desired.

The metering mechanism 40 may be a volumetric metering mechanism, but may be any other suitable metering mechanism that is known in the art or hereinafter developed. As identified above, the product passages 42, 44 direct the product from the metering mechanism 40 into the main conduits 38 which carry the product in the air stream to the downstream distribution towers 50. Each tower 50 includes an uppermost distributing head 52 located at the uppermost end of a vertical distribution tube 54. The head 52 evenly divides the flow of product into a number of distribution lines 58. Each distribution line 58 delivers product to a downstream row unit 60. The row unit 60 opens a furrow 62 in the soil surface S. The distribution line deposits the product into the furrow 62 and a trailing firming or closing wheel 64 (FIG. 1) firms the soil over the deposited product. Although the row unit 60 shown in FIGS. 1 and 2 shows a shank with a point for opening the furrow 62, and shows only one distribution line 58 to each row unit 60, it should be appreciated that the row unit 60 may be a single pass, double-shoot row unit utilizing a cutting disc and boot with dual distribution lines 58 for delivering seed and fertilizer to the soil, such as disclosed in U.S. Pat. Nos. 8,275,525, 9,826,667 and 9,968,030, each of which is incorporated herein in their entireties by reference, and which ae commercially embodied in the Case 500 Series air seeder.

Continuing to refer to FIG. 2, the metering mechanisms 40 include variable speed meter drives 72, 74 connected to respective product meters 76, 78 located in the bottom of the respective tanks 12, 14. As the drives 72, 74 rotate the respective meters 76, 78, product from the respective tanks 12, 14 are delivered via the respective product passages 42, 44 into the main conduit 38 which, in turn, conveys the product to the distribution tower 50. A feed rate controller 84 is connected to the variable speed meter drives 72, 74.

The feed rate controller 84 is in signal communication with the monitoring device 110 of the monitoring system 100. In one embodiment, the monitoring device 110 is in communication with a speed sensor 168 which detects the ground speed of the air seeder 10. The monitoring device controls the feed rate controller 84 to adjust the meter drive speeds to maintain a selected product feed rate with changing ground speed. In an alternative embodiment, the feed rate controller 84 may be coupled so as to be ground driven through a transmission with an output ratio that is adjustable from the cab of the tractor. The monitoring device 110 is also in communication with the GPS receiver 166, 131. The monitoring device 110 controls the feed rate controller 84 to adjust metering rates depending upon the air seeder's location within the field. As discussed previously, the monitoring device 110 includes an input device, such as GUI 112, to allow the operator to enter a desired product feed rate such as pounds per acre or seeds per acre, etc.

A feed rate sensor 96, such as the "meter output sensors" as disclosed in U.S. Patent Publication No. US2010/0264163 and identified by reference number 108 therein, previously incorporated by reference, may be provided for each of the product passages 42, 44 to measure the product flow rate through the passages 42, 44. Each of the feed rate sensors 96 is in data communication with the monitoring device 110. The feed rate sensor 96 generates an output signal indicative of the flow rate of the product through the respective product passages 42, 44.

It should be appreciated that when applying product at high application rates such as small seeds (e.g., canola, flax, millet, oats, wheat, etc.) and granular fertilizers wherein the application rate is typically measured by product weight per acre, the product flows through the distribution lines 58 in a substantially continuous product stream. It is noted that U.S. Patent Publication No. US2010/0264163 referenced above purports that the "meter output sensor 108" disclosed therein, is capable of detecting actual particle counts at low application rates and intermediate application rates. However, despite the purported disclosure of U.S. Patent Publication No. US2010/0264163, Applicant is not aware of any commercially available feed rate sensor or meter output sensor for an air seeder (as opposed to for a singulating planter) that is capable of accurate detection of seed count over the ranges of the application rates at which air seeders typically operate.

In air seeders 10 having "sectional control" wherein the flow of product from the meters 76, 78 is selectively shout off in a given product passage 42, 44, the use of the feed rate sensors 96 in the product passages 42, 44 can verify that the flow has actually been stopped in the given product passage by having the metering device 110 monitor the output of the feed rate sensor 96 for that product passage 42, 44. Additionally, if there is a blockage in the tank 12, 14 that starves the meter 76, 78 of product, or a meter malfunction such that product stops flowing from the meters 76, 78, the feed rate sensors 96 will detect a cessation in product flow which will cause the monitoring device 110 to alert the operator accordingly.

During startup, the initial voltage from each feed rate sensor 96 may be used to test if all of the sensor channels are in good shape, i.e., no damage of sensors, no dirt covering a portion of the sensor, etc. The monitoring device 110 may alert the operator if any sensor is not operational.

There is an advantage to locating the feed rate sensor 96 immediately after the meter and before any further divisions of the particle flow takes place such as at the towers 54. A benefit of locating the sensor in the passages 42, 44 is that only a single commodity will be present in any given passage. However, locating the feed rate sensor 96 on the secondary distribution lines 58 would have the advantage of reducing the number of seeds or particles that each sensor must count which may provide more accurate seed counts. On the other hand, in embodiments where seed and fertilizer is mixed together at the secondary distribution lines 58, locating the feed rate sensor 96 in the secondary distribution lines 58 may make it more complex to measure any one material.

Blockage Sensors

Because the feed rate sensors 96 are disposed in the passages 42, 44 upstream of the tower 50 and the distribution lines 58 delivering the product to the row units 60, the feed rate sensors 96 are unable to detect whether product is actually being delivered to each row unit 60 through the downstream distribution lines 58. Accordingly, it is also known to provide blockage sensors in the downstream distribution lines to sense a "no-flow" or "low flow" conditions to alert the operator that a particular distribution line to a row unit is not properly dispensing product. While blockage sensors may serve their intended purpose, such blockage sensors are not configured to detect momentary gaps in the product stream that can occur under normal operating conditions. For example, momentary gaps in the substantially continuous product stream may be due to momentary or partial meter blockage, momentary or partial obstructions within the distribution lines that quickly clear themselves, or due to some seeds ricocheting within the distribution lines as a result of a bend in the distribution line or a slightly worn area of the distribution line causing some seeds in the airstream to slow down relative to other seeds in the air stream, etc.

Accordingly, it is desirable to provide blockage sensors 98 in each distribution line 58 at or near each row unit 60 so any gaps in the product stream are detected. Examples of blockage sensors 98 include blockage sensors available from Dickey John, 5200 Dickey John Road, Auburn, IL 62615 or from Intelligent Ag, 1810 NDSU Research Cir. N., Fargo, ND 58102. Even assuming these commercially available blockage sensors can be configured to detect momentary gaps in the product stream, the monitoring systems associated with air seeders are configured to only provide an alert to the operator if the duration of the gap is of sufficient duration to warrant an alert to the operator of a "no-flow" or "low flow" condition.

Figure 3A:
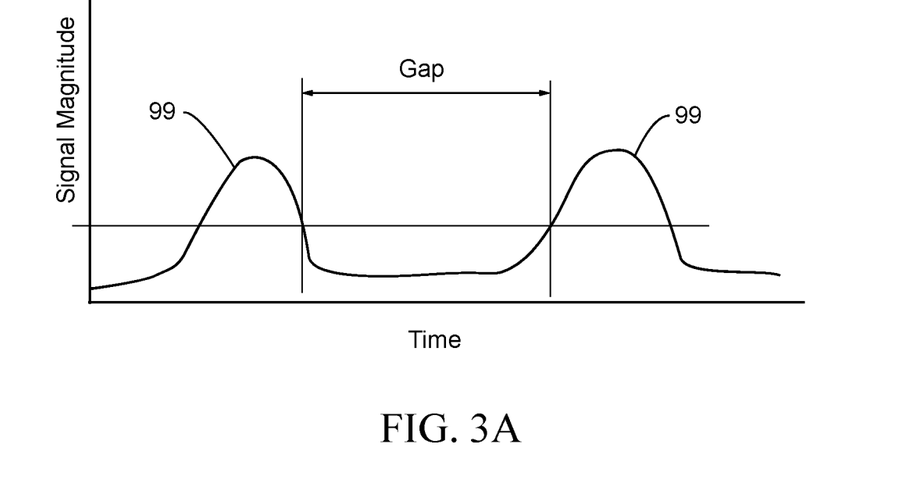
FIGS. 3A-3B represent signals generated by blockage sensors for determining gaps in the product stream.
Figure 3B:
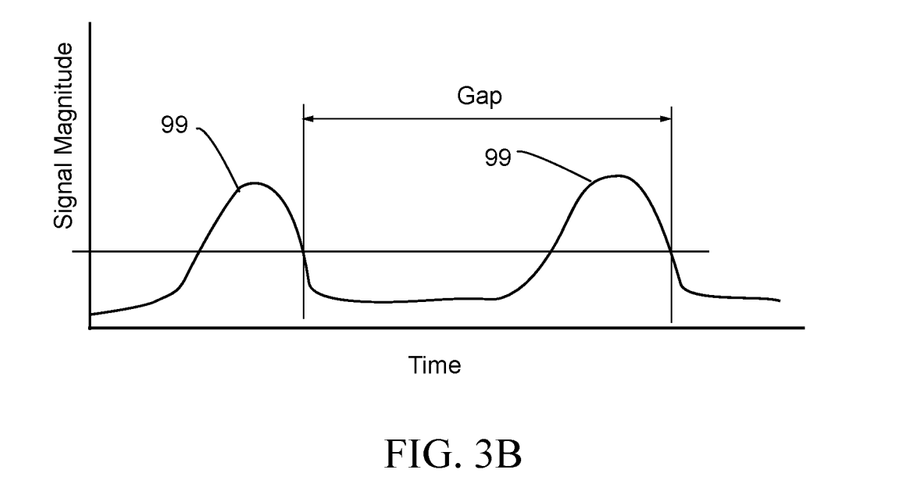

In operation, it should be appreciated that the blockage sensor 98 generates an output signal. When there is an interruption in the product stream passing the sensor or when there is a resumption of the product stream passing the sensor, the output signal changes in magnitude. This change in signal magnitude generates a signal pulse 99 as represented in FIG. 3A and defines a gap between the trailing end of a leading product stream and the leading end of a trailing product stream. Thus, in one embodiment a "Gap" may be defined as the distance or time between the falling edge of the generated pulse 99 of one product stream (i.e., a leading product stream) to the rising edge of the generated pulse 99 of the next product stream (i.e., a trailing product stream). Alternatively, as shown in FIG. 3B, a "Gap" may be defined as the distance or time between the rising edge of the generated pulse 99 of one product stream (i.e., a leading product stream) to the rising edge of the generated pulse 99 of the next product stream (i.e., a trailing product stream). Alternatively, although not shown, a "Gap" may be defined as the distance or time between the falling edge of the generated pulse 99 of one product stream (i.e., a leading product stream) to the falling edge of the generated pulse 99 of the next product stream (i.e., a trailing product stream). If the Gap exceeds a Gap Threshold (which may be a user defined parameter or a calculated parameter based on a selected application rate and the ground speed of the air seeder), the monitoring system 100 records the occurrence of a Gap. Each recorded Gap may be time stamped and associated with GPS coordinates.

Mapping Gaps/Acre

Figure 6:
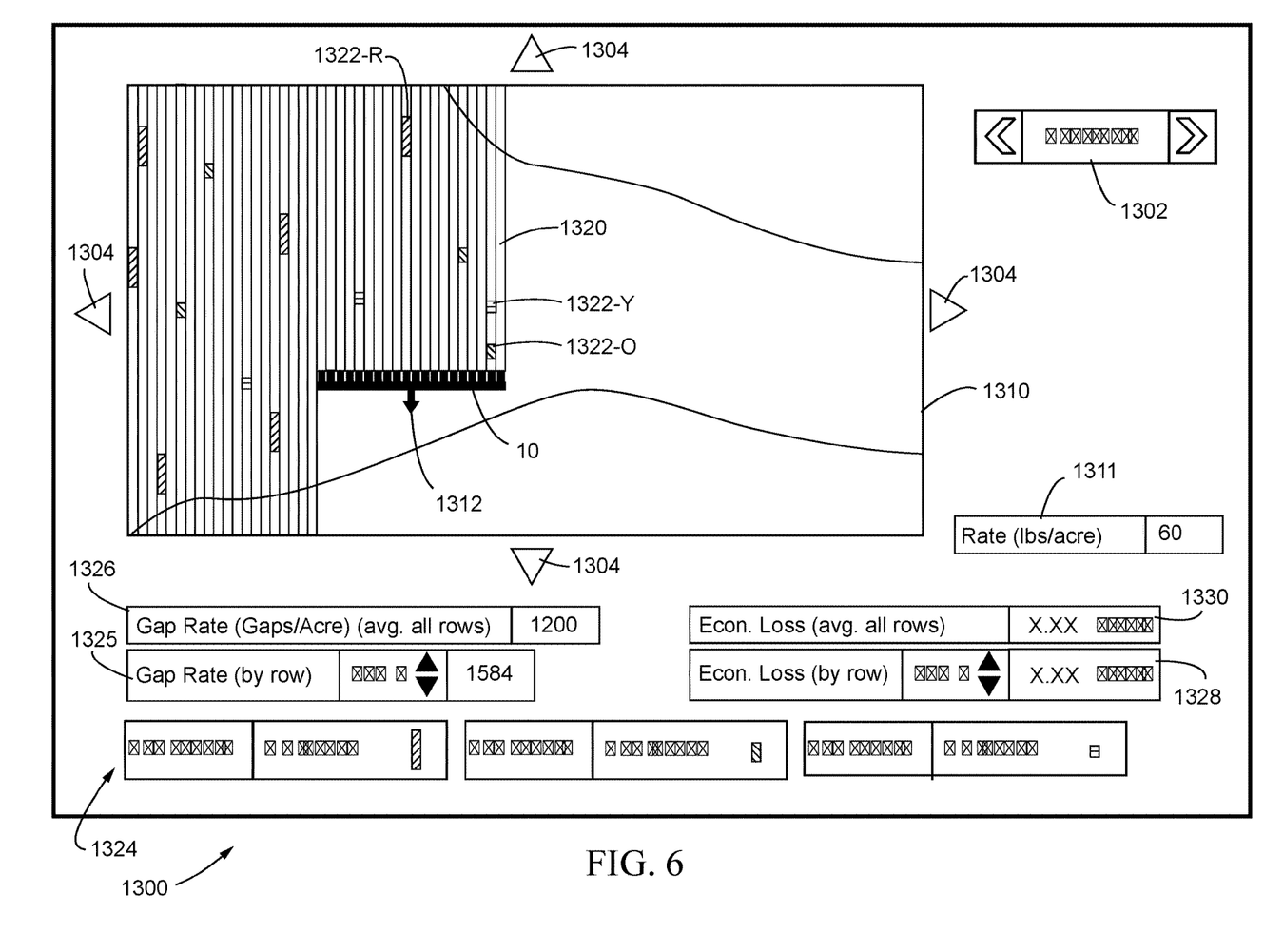
FIG. 6 is an embodiment of a gap rate map.

The monitor system 100 may generate maps on the display device 130 which are visible to the operator in the cab of the tractor pulling the air seeder 10. In the example of FIG. 6, a Gaps/Acre map 1300 is shown. The display device 130 may include an interface 1302 which allows the operator to select a particular map of interest. The Gaps/Acre map 1300 may include a field window 1310 which displays an aerial image of the field in which the air seeder 10 is operating. The manner of retrieving and displaying aerial images of fields on a display device is well known and therefore further explanation and discussion is not warranted. Arrows 1304 allow the operator to scroll the area of the field displayed within the field window 1310 to the left, to the right, up and down. The Gaps/Acre map 1300 may also display the product application rate 1311 which is being applied as detected by the feed rate sensors 96. The Gaps/Acre map 1300 may also include a schematic representation of the location of the air seeder 10 within the field in real-time based on the GPS coordinates from the GPS receiver 166, 131. A direction arrow 1312 may indicate the direction of travel of the air seeder 10 within the field. As the air seeder 10 traverses the field, a bar or block 1320 is placed within the field boundary of the displayed field corresponding to each row unit 60 of the air seeder 10 indicating the area of the filed over which the row unit has passed.

Upon the occurrence of a Gap (i.e., a detected gap in exceeding the Gap Threshold) as explained above, the Gap is time stamped and associated with GPS coordinates and is visibly displayed within the field in real-time as a Gap Block 1322. Each Gap Block 1322 may be associated with a predefined time or distance, such that if a Gap of an extended duration is detected, multiple Gap Blocks 1322 may be stacked in successive relation within the field window and the cumulative grouping of Gap Blocks 1322 may be color coded with a representative color indicating actual Gap lengths or durations. For example if one Gap Block 1322 is generated, the Gap Block may be color coded yellow. If two Gap Blocks 1322 are stacked together in successive relation, the two cumulative Gap Blocks may be color coded orange. If three or more Gap Blocks are stacked together in successive relation, the cumulative multiple Gap Blocks may be color coded red. All other blocks 1320 indicating the areas of the field previously traveled by the row unit 60 may be colored as green indicating consistently or uniformly dispensed product. Alternatively, when a Gap occurs, the monitor system may time stamp and record the GPS coordinates at both the trailing and leading edges of the signals defining the Gap (or in the alternative Gap definition, both the trailing edges of the signals defining the Gap are time stamped and the GPS coordinates recorded). The Gap block 1322 displayed in the field would therefore represent an actual length of the Gap on the map. Again, different lengths of Gap Blocks 1322 may be color coded with a representative color indicating actual Gap lengths or durations. For example Gap lengths in excess of 9 inches may be colored as a red Gap block 1322-R, Gap lengths between 3 and 9 inches may be colored as an orange Gap block 1322-O and Gap lengths less than 3 inches may be colored as a yellow Gap block 1322-Y, with all other blocks 1320 indicating the areas of the field previously traveled by the row unit 60 colored as green indicating consistently or uniformly dispensed product. It should be appreciated that color coding other than green, yellow, orange and red may be used and other Gap lengths may associated with the various colors. Likewise, coding schemes other than color may also be utilized. The display screen may also include a legend 1324 identifying the Gap length with the corresponding color or coding scheme The monitoring system 100 may be programmed to calculate a Gap Rate which may also be displayed on the display screen. The Gap Rate may be by row as indicated by reference number 1325. In one embodiment, the Gap Rate is in units of Gaps per acre. However, it should be appreciated that instead of Gaps per acre, the units of the Gap Rate may be Gaps per hector or other desired units. By way of example, for calculating the Gap Rate, it is assumed that the air seeder has 7.5 inch row spacings. Thus, the distance that one row unit 60 must travel to cover one acre (i.e., Distance Traveled Per Acre (DTPA)) is 69,696 feet, calculated as follows:

$$DTPA = 43560 \frac{ft^2}{acre} \div \left(7.5 \text{ in} \div \frac{1 \text{ ft}}{12 \text{ in}}\right) = 69,696 \frac{ft}{acre}$$

To determine the Gap Rate, the monitor system 100 may use a rolling average of the number of Gaps detected over a given sampling period (e.g., 15 seconds). Thus, assuming the sampling period is 15 seconds, and assuming the average detected ground speed of the air seeder over that 15 second sampling period is six miles per hour, the Distance Traveled Per Sampling Period (DTPSP) is 132 feet, calculated as follows:

$$DTPSP = 6 \frac{\text{miles}}{\text{hr}} \times 5280 \frac{ft}{\text{mile}} \times \frac{1 \text{ hr}}{3600 \text{ sec}} \times 15 \text{ sec} = 132 \text{ ft}$$

Assuming the blockage sensor 98 detects three Gaps over that assumed 15 second sampling period, the Gap Rate for that row unit would be 1584 Gaps/acre calculated as follows:

$$\text{Gap Rate} = 69696 \frac{ft}{acre} \div 132 \text{ ft} \times 3 = 1584 \frac{\text{Gaps}}{acre}$$

The Gap Rate of the individual row units 60 (or individual distribution lines 58) may be combined to provide an average Gap Rate across the entire air seeder as indicated by reference number 1326. The Gap Rate of each row unit 60 or distribution line 58 may be associated with an economic loss value associated with different ranges of Gap Rates. The economic loss value may be based on empirical data. The economic loss value per row may be displayed on the Gap map 1300 as indicated by reference number 1328 or an economic loss value for all rows may be displayed on the Gap map 1300 as indicated by reference number 1330.

Other maps may be generated using the monitor system 100 and various other sensors such as disclosed in the '958, previously incorporated by reference, including by way of example, application rate maps, downforce maps, ride quality maps and linked maps. However, it should be appreciated that the air seeder 10, or individual row units 60, or gangs of row units 60, would require additional instrumentation with appropriate sensors (e.g., downforce sensors, accelerometers, etc.) as disclosed in the '958 patent to measure and display such operational or performance characteristics.

The foregoing description and drawings are intended to be illustrative and not restrictive. Various modifications to the embodiments and to the general principles and features of the system and methods described herein will be apparent to those of skill in the art. Thus, the disclosure should be accorded the widest scope consistent with the appended claims and the full scope of the equivalents to which such claims are entitled.

The invention claimed is:

1. A monitoring system for a seeder having a plurality of row units, the seeder including a metering mechanism that meters product from a product source into a plurality of distribution lines, wherein the product flows through each one of the plurality of distribution lines in a substantially continuous product stream to a respective one of the plurality of row units, each of the plurality of row units adapted to deliver the product to a furrow formed in a soil surface of a field as the seeder advances through the field in a forward direction of travel, the monitoring system comprising:

a monitoring device;

a GPS receiver in communication with the monitoring device;

a display device in communication with the monitoring device, the display device configured to display an aerial view of the field with a schematic representation of the seeder's real-time location within the field as the seeder advances through the field;

a sensor disposed in each one of the plurality of distribution lines, the sensor configured to generate an output signal that changes in magnitude upon an interruption of the product stream and again upon a resumption of the product stream through the distribution line, each change in magnitude of the output signal generating a signal pulse;

whereby the monitoring device is configured to timestamp each generated signal pulse and to measure a time duration between successive signal pulses, the measured time duration defining a gap in the product stream, each gap defining a leading product stream from a trailing product stream;

whereby, the monitoring device is configured to determine if each gap exceeds a gap threshold, and for each gap exceeding the gap threshold, the monitoring device is configured to record the gap and associate the recorded gap with a GPS location;

whereby the display device is configured to display, in real-time, a visual representation of each recorded gap within the field based on the recorded gap's associated GPS location thereby providing visual representation of operational performance of the seeder within the field.

2. The monitoring system of claim 1, wherein the seeder is an air seeder, and wherein an air stream is flowing through the distribution lines, whereby the air stream carries the metered product producing the product stream.

3. The monitoring system of claim 1, wherein the measured time duration of the gap is a duration of time measured between a falling edge of the signal pulse of the leading product stream and a rising edge of the signal pulse of the trailing product stream.

4. The monitoring system of claim 1, wherein the measured time duration of the gap is a duration of time measured between a rising edge of the signal pulse of the leading product stream and the rising edge of the signal pulse of the trailing product stream.

5. The monitoring system of claim 1, wherein the gap threshold is a user defined parameter.

6. The monitoring system of claim 1, wherein the gap threshold is a calculated parameter based on a selected product application rate and a ground speed of the seeder.

7. The monitoring system of claim 1, wherein the monitoring device is configured to calculate a gap rate, the gap rate corresponding to a number of occurrences of recorded gaps over a predetermined unit of measurement, the predetermined unit of measurement being one of distance and area.

8. The monitoring system of claim 7, wherein the predetermined unit of measurement is one of acres and hectors.

9. The monitoring system of claim 7, wherein the display device is configured to numerically display the calculated gap rate.

10. The monitoring system of claim 1, wherein the visual representation of the recorded gaps is associated with a color scheme, whereby different colors are associated with different ranges of the measured time durations of the recorded gaps.

11. The monitoring system of claim 1, wherein the monitoring device is configured to calculate an economic loss value based on different ranges of the gap rate.

12. The monitoring system of claim 11, wherein the display device is configured to display the calculated economic loss value.

13. A method of generating a gap rate map indicative of performance of a seeder while operating in a field, the seeder including a plurality of row units and a metering mechanism that meters a product from a product source into a plurality of distribution lines, wherein the product flows through each one of the plurality of distributions lines in a substantially continuous product stream to a respective one of the plurality of row units, each of the plurality of row units delivering the product to a furrow formed in a soil surface of a field as the seeder advances through the field in a forward direction of travel, the method comprising:

with the seeder operating in the field and traveling in the forward direction of travel, and with a sensor disposed in each one of the plurality of distribution lines, the sensor generating an output signal that changes in magnitude upon an interruption of the product stream through the distribution line and again upon a resumption of the product stream through the distribution line, each change in magnitude of the output signal generating a signal pulse;

with a monitoring device in signal communication with said sensor, timestamping each generated signal pulse and measuring a time duration between successive signal pulses, the measured time duration defining a gap in the product stream, each gap defining a leading product stream from a trailing product stream; and with the monitoring device:
determining if each gap exceeds a gap threshold;
recording the gap if the gap exceeds the gap threshold;
associating GPS coordinates with each recorded gap;
displaying to the operator an aerial view of the field with a schematic representation of the seeder's real-time location within the field as the seeder advances through the field; and
displaying to the operator, in real-time, a visual representation of each recorded gap within the field based on the recorded gap's associated GPS coordinates.

14. The method of claim 12, wherein the seeder is an air seeder, and wherein an air stream is flowing through the distribution lines, whereby the air stream carries the metered product producing the product stream.

15. The method of claim 13, wherein the step of measuring the time duration of the gap includes measuring a duration of time between a falling edge of one of the signal pulses and a rising edge of an immediately subsequent one of the signal pulses.

16. The method of claim 13, wherein the step of measuring the time duration of the gap includes measuring a duration of time between a rising edge of one of the signal pulses and a rising edge of an immediately subsequent one of the signal pulses.

17. The method of claim 13, wherein the gap threshold is a user defined parameter.

18. The method of claim 13, wherein the gap threshold is a calculated parameter based on a selected product application rate and a ground speed of the seeder.

19. The method of claim 13, wherein the visual representation of the recorded gaps is associated with a color scheme, whereby different colors are associated with different ranges of the durations of the recorded gaps.

20. The method of claim 13, further comprising:
with the monitoring device, calculating a gap rate by determining a number of occurrences of the recorded gaps over a predetermined unit of measurement, the predetermined unit of measurement being one of distance and area; and
displaying the calculated gap rate to the operator via the monitoring device.

21. The method of claim 20, wherein the predetermined unit of measurement is one of acres and hectors.

22. The method of claim 20, further comprising:
with the monitoring device, calculating an economic loss value based on different ranges of the gap rate; and
displaying the calculated economic loss value to the operator via the monitoring device.

23. A method of generating gap rates indicative of performance of a seeder while operating in a field, the seeder including a plurality of row units, a product source containing a product, and a metering mechanism configured to meter the product from the product source into a plurality of distribution lines, wherein the product flows through each one of the plurality of distributions lines in a substantially continuous product stream to a respective one of the plurality of row units, each of the plurality of row units delivering the product to a furrow formed in a soil surface of a field as the seeder advances through the field in a forward direction of travel, the method comprising:
with the seeder operating in the field and traveling in the forward direction of travel, and with a sensor disposed in each distribution line, the sensor generating an output signal that changes in magnitude upon an interruption of the product stream through the distribution line and upon a resumption of the product stream through the distribution line, each change in magnitude of the output signal generating a signal pulse;
with a monitoring device in signal communication with said sensor, timestamping each generated signal pulse and measuring a time duration between successive signal pulses, the measured time duration defining a gap in the product stream, each gap defining a leading product stream from a trailing product stream; and
with the monitoring device:
determining if each gap exceeds a gap threshold; and recording the gap if the gap exceeds the gap threshold;
calculating a gap rate by determining a number of occurrences of recorded gaps over a predetermined unit of measurement, the predetermined unit of measurement being one of distance and area; and
displaying the calculated gap rate to an operator.

24. The method of claim 23, wherein the seeder is an air seeder, and wherein an air stream is flowing through the distribution lines, whereby the air stream carries the metered product producing the product stream.

25. The method of claim 23, wherein the measured time duration is a duration of time measured between a falling edge of one of the signal pulses and a rising edge of an immediately subsequent one of the signal pulses.

26. The method of claim 23, wherein the measured time duration is a duration of time measured between a rising edge of one of the signal pulses and a rising edge of an immediately subsequent one of the signal pulses.

27. The method of claim 23, wherein the gap threshold is a user defined parameter.

28. The method of claim 23, wherein the gap threshold is a calculated parameter based on a selected product application rate and a ground speed of the seeder.

29. The method of claim 23, wherein the predetermined unit of measurement is one of acres and hectors.

30. The method of claim 23, further comprising:
with the monitoring device:
associating GPS coordinates with each recorded gap; and
displaying to the operator an aerial view of the field with a schematic representation of the seeder's real-time location within the field as the seeder advances through the field;
displaying to the operator, in real-time, a visual representation of each recorded gap within the field based on the recorded gap's associated GPS coordinates.

31. The method of claim 27, wherein the visual representation of the recorded gaps is associated with a color scheme, whereby different colors are associated with different ranges of the durations of the recorded gaps.

32. The method of claim 27, further comprising:
with the monitoring device:
calculating an economic loss value based on different ranges of the gap rate; and
displaying the calculated economic loss value to the operator.

* * * * *